Figure 6:
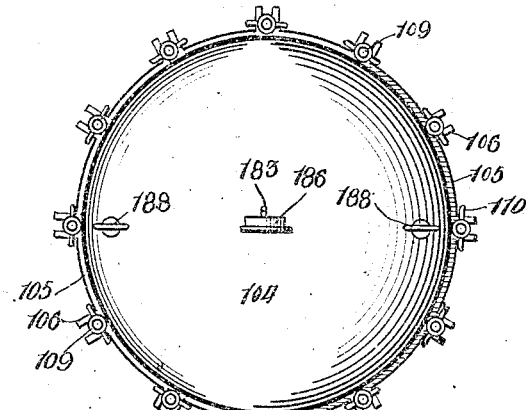

No. 863,884.  
PATENTED AUG. 20, 1907.  
A. SCHNEIDER.  
MACHINE FOR BOTTLING LIQUIDS.  
APPLICATION FILED FEB. 21, 1907.  
7 SHEETS—SHEET 1.
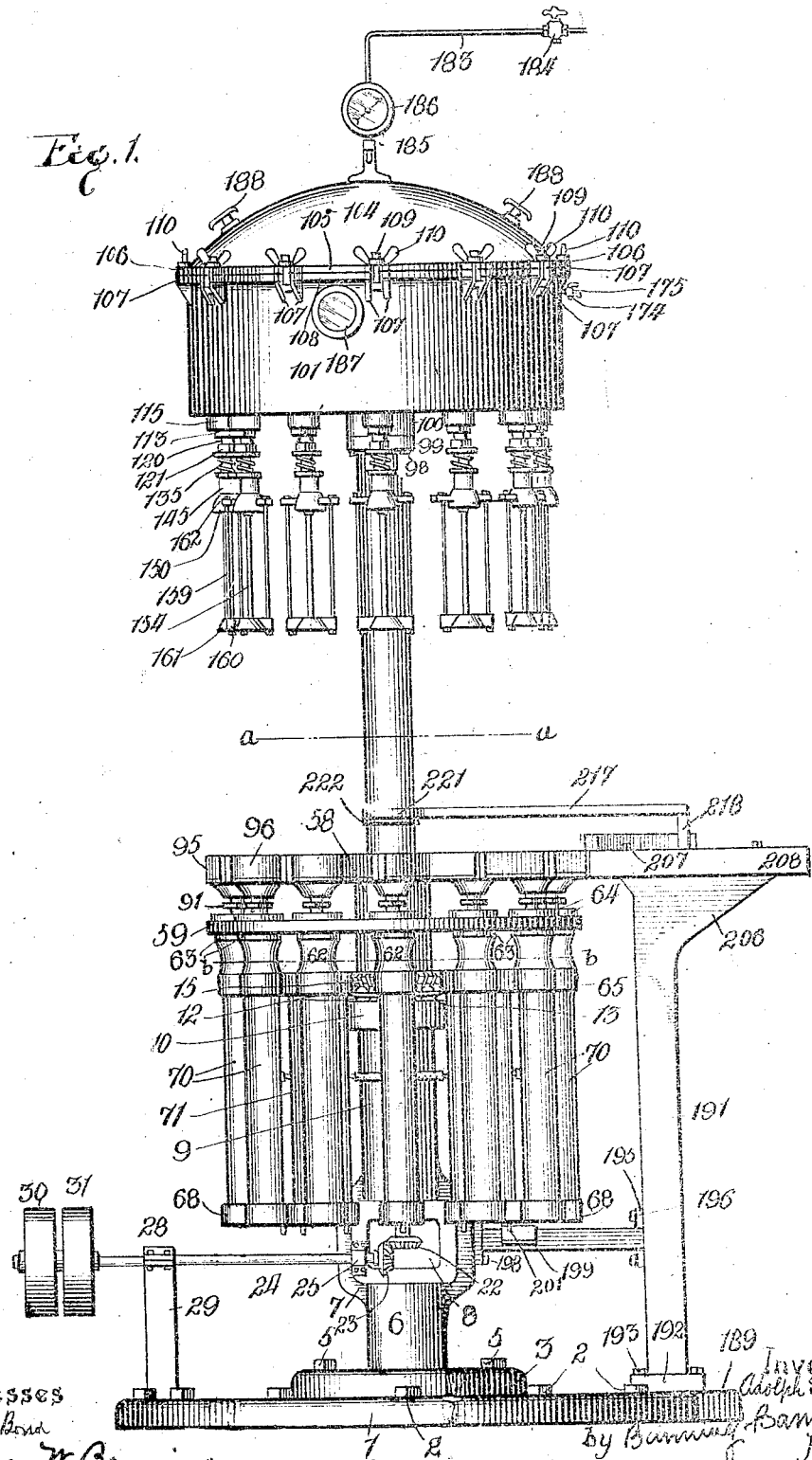

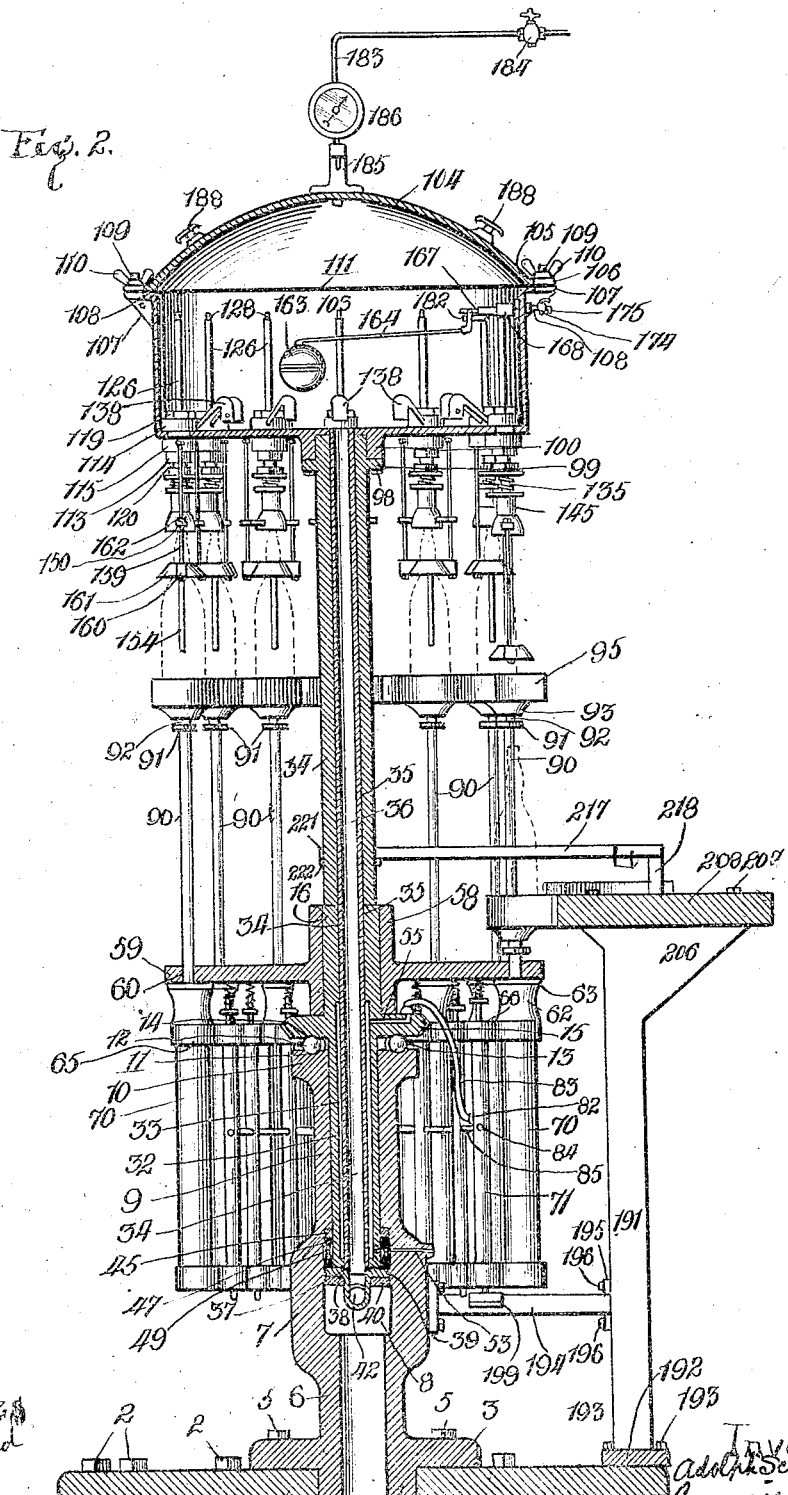

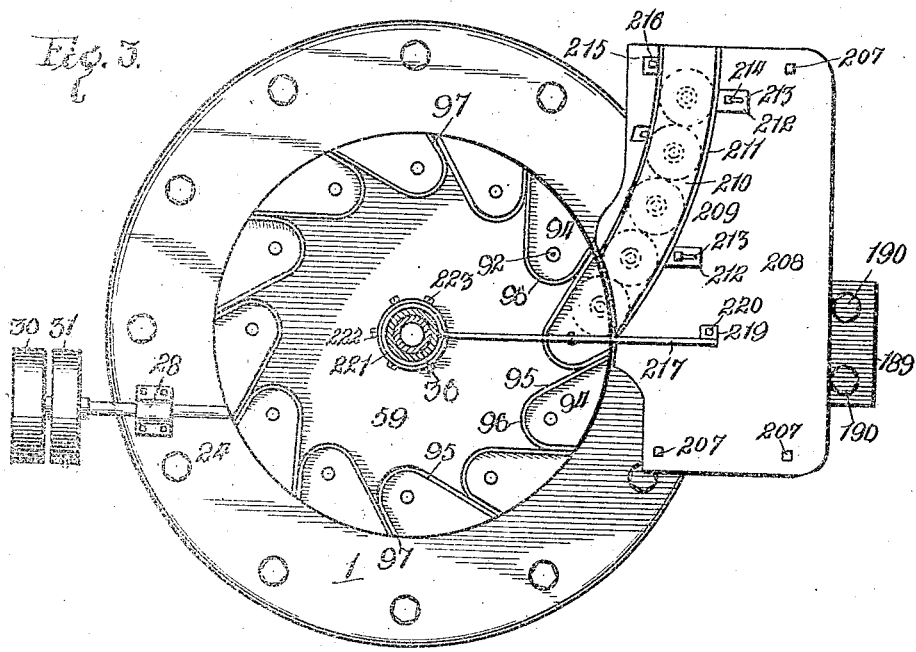

No. 863,884. PATENTED AUG. 20, 1907.
A. SCHNEIDER.
MACHINE FOR BOTTLING LIQUIDS.
APPLICATION FILED FEB. 21, 1907.

7 SHEETS—SHEET 4.

Witnesses
Wm. P. Bond
Pierson W. Banning.

Inventor
Adolph Schneider
by Banning & Banning
Attys

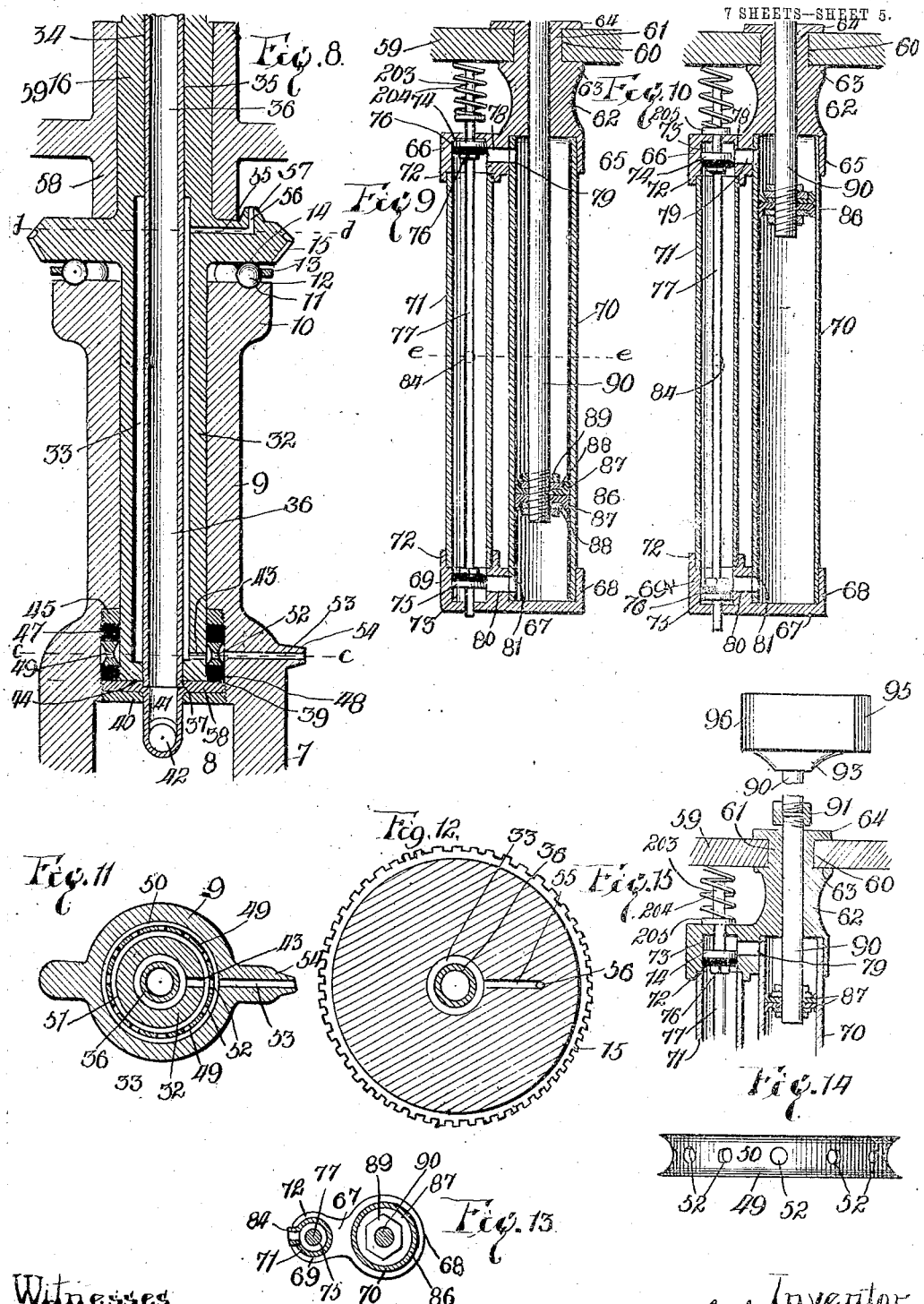

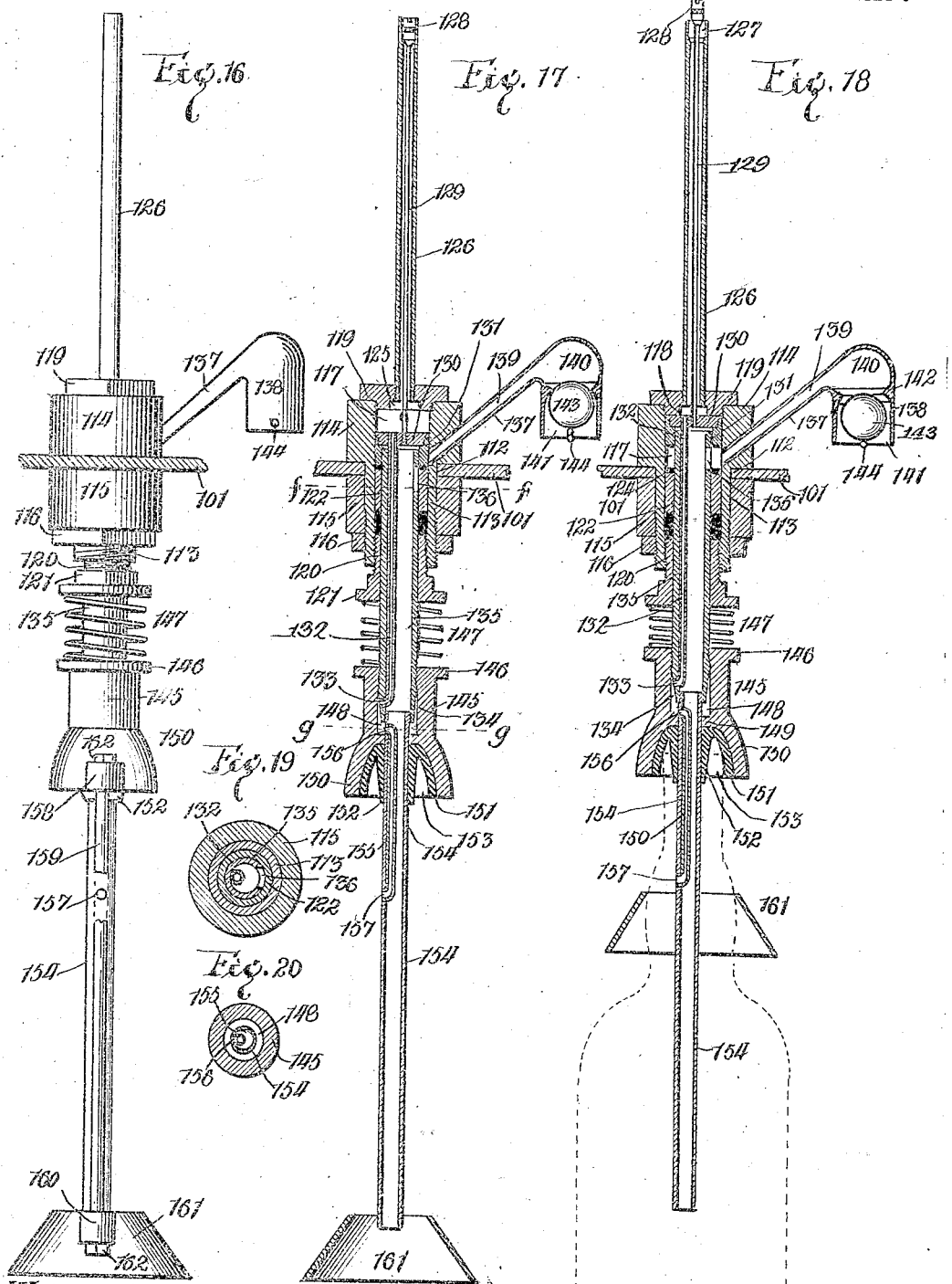

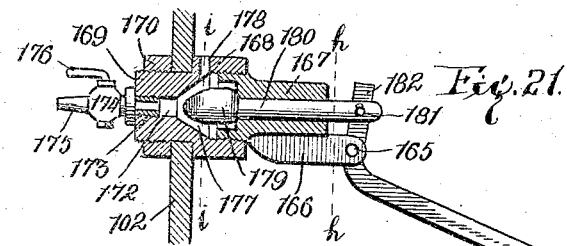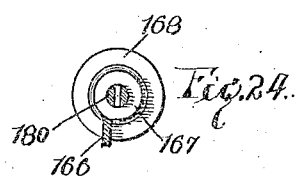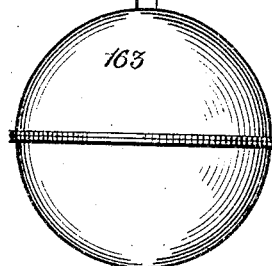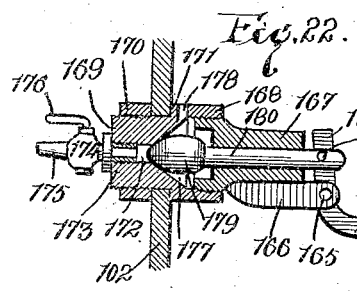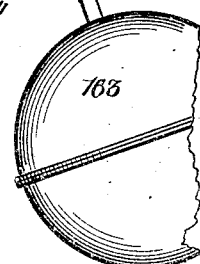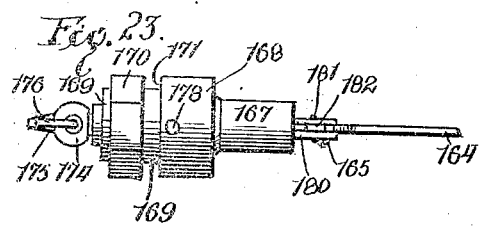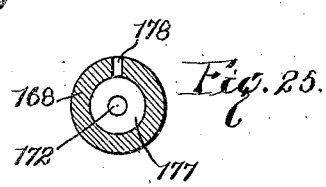

UNITED STATES PATENT OFFICE.

ADOLPH SCHNEIDER, OF CHICAGO, ILLINOIS.

MACHINE FOR BOTTLING LIQUIDS.

No. 863,884.       Specification of Letters Patent.       Patented Aug. 20, 1907.

Application filed February 21, 1907. Serial No. 358,593.

*To all whom it may concern:*

Be it known that I, ADOLPH SCHNEIDER, a citizen of the United States, residing at Chicago, in the county of Cook and State of Illinois, have invented certain new and useful Improvements in Machines for Bottling Liquids, of which the following is a specification.

This invention relates to machines for filling bottles of that type employing a rotatable tank carrying a plurality of filling tubes, which tank operates in connection with a plurality of bottle supports so that, as the tank is revolved, the bottles will be successively filled with the liquid, and when filled removed from the support and replaced by another bottle to be filled, thus facilitating the filling of the bottles.
The features of construction entering into the machine, while specially applicable for use with a revoluble tank and a revoluble bottle support, as to some of said features, are adapted for use and can be used with other types or forms of machines for filling bottles, and particularly so as to the operation of the filling tubes and the operation of the supports for the bottle.

The objects of the invention are to improve the main support or standard carrying the supports for the bottles and the filling tank, so as to furnish a clear passage for the liquid through the main support or standard to be discharged into the filling tank for withdrawal therefrom in filling the bottles; to improve the means for rotating the support carrying the bottles and the filling tank carrying the filling tube; to positively and automatically raise and lower successively the bottle supports; to actuate each bottle support independently through the medium of a motor cylinder and a controlling valve for each cylinder; to furnish the necessary pressure for operating the motor cylinders by supplying the pressure to a single controlling valve and through such valve supplying pressure to the remaining valves for operating the cylinders; to raise and lower each bottle support independently by means of a piston rod and piston, with the piston located and operating in a cylinder receiving pressure at each end thereof for the pressure to act and raise and lower the bottle support; to suspend the motor cylinders from a revoluble table or support carried by a revoluble shaft driven from a suitable driving power; to construct a bottle support adapted to receive a bottle and permit the ready removal of the bottle and its replacement by a fresh bottle without interfering with the rotation of the table or plate carrying the motor cylinders and the bottle supports; to furnish a rotatable shaft carrying the motor cylinders and the bottle supports and having fixedly attached to its upper end the filling tank; to improve the construction, arrangement and operation of the filling tank and the filling tubes; to positively and automatically control the flow of liquid from the filling tank into the bottles; to furnish a guide coacting with the filling tube and the sealing head for properly and correctly centering the bottle with the sealing head; to improve the construction and operation of the sealing head and the filling tube and the connection therefor with the filling tank; to control the venting of the pressure through the rise and fall of the liquid in the filling tank; and to improve generally the construction and operation of the several elements entering into the formation of the machine as a whole.

The invention consists in the features of construction and combinations of parts hereinafter described and claimed.

Figure 7:
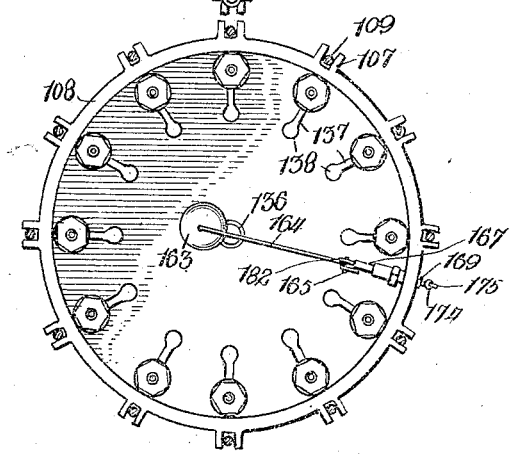
Figure 5:
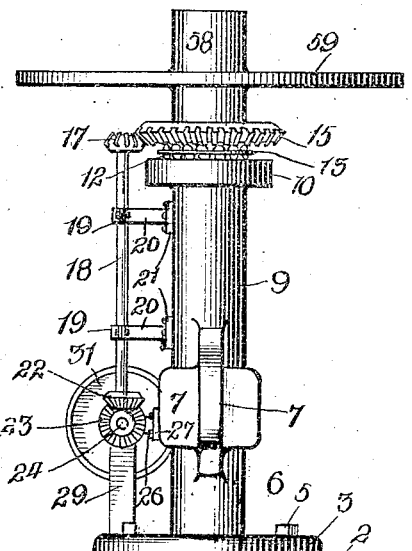

In the drawings, illustrating the invention, Figure 1 is an elevation of the machine as a whole; Fig. 2 a sectional elevation of the machine as a whole; Fig. 3 a top or plan view of the base with the bottle support and the trackway for removing the bottles, taken on line *a—a* of Fig. 1; Fig. 4 a sectional plan view of the base and the motor cylinders, taken on line *b—b* of Fig. 1; Fig. 5 an elevation of the driving means for the rotatable shaft and table carrying the motor cylinders; Fig. 6 a top or plan view of the filling tank; Fig. 7 a plan view of the filling tank with the cover removed;
Fig. 8 a detail in sectional elevation of the main support or standard and the revoluble shaft and driving gear with ball bearing thereof; Fig. 9 a detail in sectional elevation of one of the motor cylinders, showing the valve and piston in position for a lowered bottle support; Fig. 10 a similar view to Fig. 9, showing the controlling valve and piston in position for a raised bottle support; Fig. 11 a cross section on line *c—c* of Fig. 8; Fig. 12 a cross section on line *d—d'* of Fig. 8; Fig. 13 a cross section on line *e—e* of Fig. 9; Fig. 14 a detail in full elevation of the ring for admitting pressure to the main driving shaft; Fig. 15 a detail in section of one of the bottle supports and its piston rod; Fig. 16 an elevation of a filling tube and its connections, with the rod supporting the guide for the neck of the bottle partly broken out; Fig. 17 a sectional elevation of the filling tube shown in Fig. 16, with the vent valve closed and the filling tube depressed, closing the liquid supply port; Fig. 18 a similar view to Fig. 17, with the vent valve opened and the filling tube raised to open the port for the admission of liquid; Fig. 19 a cross section on line *f—f* of Fig. 17; Fig. 20 a cross section on line *g—g* of Fig. 17; Fig. 21 an elevation partly in section of the float and valve controlling the venting of pressure from the filling tank, with the venting valve open; Fig. 22 a similar view to Fig. 21, with the venting valve closed; Fig. 23 a top or plan view of the controlling valve of Figs. 21 and 22; Fig. 24 a cross section on line *h—h* of Fig. 21; and Fig. 25 a cross section on line *i—i* of Fig. 21.
The machine, in the construction and arrangement shown, has a base plate or platform 1 adapted to be attached by bolts 2 to a floor or other support. The base plate or platform has mounted thereon a plate or secondary base 3, having a neck or boss 4 entering a hole in the primary base plate 1, and secured to the base plate or platform 1 by bolts 5 passing through the secondary plate 3 and into the main base plate or platform. The secondary plate or base 3 has upwardly extending therefrom a neck or wall 6 integral with which is formed a yoke or arm 7 having a central opening 8, and from the yoke or arm 7 upwardly extends a tubular neck or standard 9, terminating at its upper end in a flange or bearing 10, having in its upper face an annular recess or groove 11 forming a trackway for a plurality of balls. The balls 12 run in the trackway or groove 11 and are encircled by a retaining ring 13, by which the balls are held in place against lateral movement. The balls 12 also run in a trackway or groove 14 formed in the under face of a bevel gear 15, having a hub 16 upwardly extending from the body of the gear.

The bevel gear 15 meshes with a bevel pinion 17 on the upper end of a shaft 18, supported in journal boxes or bearings 19, each journal or bearing 19 carried by an arm or bar 20 attached by flanges 21 and suitable bolts to the face of the tubular standard or support 9, as shown in Fig. 5. The lower end of the vertical shaft 18 has a bevel pinion 22 which meshes with a bevel pinion or gear 23 on the end of a horizontal shaft 24, which shaft is supported at one end in a journal box 25 on the end of an arm or bar 26 attached by a flange 27 and suitable bolts to the yoke or frame 7 of the main support, and this shaft 24 is supported at its other end in a journal box 28 on the upper end of a post or standard 29 attached to the main base plate or platform 1, as shown in Fig. 1. The shaft 24 has thereon a loose pulley 30 and a fixed or driving pulley 31, as usual in power driven shafts.

The bevel gear 15 with its hub 16 is rotated from the vertical shaft 18 and horizontal shaft 24, through the connecting driving gears or pinions. The rotatable gear 15, has depending from its under face a tubular bearing or sleeve 32, the hole or bore 33 of which extends up through the bevel gear and into the hub 16, as shown in Fig. 8. The hub 16 has upwardly extending therefrom a tubular shaft 34, and this shaft, in its central hole or bore 35, receives a tube 36 which extends through the hole or bore 33 in the hub 16 and through the hole or bore 33 to the lower end of the bearing or sleeve 32, as shown in Fig. 8. The tube 36 at its lower end is stepped or supported in a recess or countersink 37, formed in a plate 38 having a screw thread on its exterior which meshes with a screw thread in the wall of a chamber 39, formed in the lower end of the standard or support 9 and upwardly extending from the chamber or opening 8 of the yoke or frame 7, as shown in Fig. 8. The plate 38 is held in an adjusted position when in the chamber 39, by a lug or jam-nut 40, also screw threaded into the chamber below the plate so as to lock and hold the plate 38 in its adjusted position and thus furnish a step or rest for the lower end of the tube 36. The plate 38 has a depending nipple 41 in which is an inlet or nozzle 42, for the attachment of a liquid supply pipe for furnishing the liquid to the supply tube 36 and to the filling tank into which the upper end of the supply tube 36 enters. The bearing or sleeve 32, the tubular shank or support 34, and the liquid supply tube 36, all revolve with the bevel gear 15 and its hub 16, so as to maintain a unity of relation between the parts in the operation of the machine without disturbing or destroying the inflow of the liquid through the supply tube 36 into the filling tank.

The tubular bearing or sleeve 32, adjacent to its lower end on one side, has therethrough a port 43, and the inner face of the bearing sleeve 32, below the port or passage, has a rim or flange 44 closely fitting around the supply tube 36 and preventing the escape of pressure below the port or passage 43, so that admitted pressure must flow upwardly through the passage, furnished by the hole or bore 33 around the liquid supply tube. The lower end of the tubular bearing or sleeve 32 has threaded thereonto a ring nut 45 which abuts against a shoulder 46 furnished by the top wall of the chamber 39, which ring nut prevents end movement of the tubular bearing or sleeve upwardly so that by means of the plate 38 and locking nut 40 and ring nut 45, the tubular bearing or sleeve 32 and its bevel gear can be properly adjusted, and when adjusted held in adjusted position so as to allow a free rotation of the parts on the ball bearings.

The chamber 39, below the ring nut 45, has therein a packing 47, and a packing 48 is located in this chamber 39 above the bearing plate 38, and between these packings 47 and 48 is located a ring 49, having an exterior circumferential groove or passage 50 and an interior circumferential groove or passage 51, with a plurality of ports 52 connecting the two passages. The passages 50 and 51 with the ports 52 furnish communication with the port 43 for admitting pressure around the liquid supply tube. A passage 53 in the wall at the base of the tubular standard or support 9 communicates with the circumferential passage 50, and this passage 53 leads through a nipple 54, adapted for the attachment thereto of hose or other means leading from a source of pressure supply, so that pressure can flow through the passage 53 and enter the circumferential passage 50 and pass through the ports 52 into the passage 51 and through the port 43 enter the passage around the liquid supply tube. The gear 15 has in its body a horizontal passage 55, which at its inner end communicating with the passage around the liquid supply tube and terminating in a vertical passage 56, extending through a nipple 57 adapted for the attachment of a hose or other conductor for transmitting pressure to the motor cylinders and actuating the pistons of the several motor cylinders as hereinafter described.

The hub 16 has fixedly secured thereto a sleeve 58 carrying a plate or table 59, which plate or table adjacent to its periphery has formed therein a plurality of holes 60, each hole having entered thereinto a neck or thimble 61 of a hanger 62, for attaching a plurality of hangers to the rotatable plate or table. The hangers are each attached by entering the neck or thimble 61 into a hole 60 to contact a shoulder 63 on the hanger and upsetting or otherwise forming the end of the neck into a washer or clench 64, so that each hanger will be rigidly and fixedly attached to the rotatable table or plate. Each hanger 62 has a socket or wall 65 and a socket or wall 66 with a web between the two sockets or walls. A plate 67 is provided to coact with each hanger 62, and each plate 67 has a socket or wall 68 and a socket or wall 69, corresponding to the sockets or walls 65 and 66, with a web between the sockets or walls. The socket or wall 65 has entered thereinto the upper end of a motor cylinder 70, and the lower end of said cylinder is entered into the socket or wall 68, so that the cylinder and the plate 67 depends from the hanger 62 and are free to revolve with the rotatable table or plate. The socket or wall 66 and the socket or wall 69, each have a rim or flange 72 which receive the upper and lower ends of a cylinder 71, which cylinder contains the controlling valve for the pressure which operates in the power or motor cylinder. Each socket or wall 66 and 69 has a chamber 73, and in the chamber 73 of the socket or wall 66 is located and operates a piston valve 74, and a piston valve 75 is located and operates in the chamber 73 of the socket or wall 69, each piston valve having a suitable packing 76, and the two piston valves carried by a rod or stem 77 extending the length of the cylinder 71, as shown in Figs. 9 and 10. The web between the sockets or walls 65 and 66 has formed therein a passage 78, which communicates with a port 79 opening into the power or motor cylinder 70 adjacent to its upper end, and the web between the sockets or walls 68 and 69 has formed therein a passage 80, which communicates with a port 81 opening into the power or motor cylinder 70 at its lower end, so that pressure from the valve cylinder can be supplied to either the upper or lower end of the power or motor cylinder according to the position of the piston valve. As shown in Fig. 9 pressure is admitted to the upper end of the power or motor cylinder 70 and is exhausted from the lower end of such cylinder into the valve chamber below the valve 75 to vent around the rod or stem of the valve: and, as shown in Fig. 10, pressure is admitted to the lower end of the power or motor cylinder 70 and escapes from the upper end of said cylinder through the passage 78 into the chamber of the valve 74 to vent around the stem or rod of the valve.

One of the valve cylinders or pressure chests 71 has on one side thereof a nipple 82 to which is attached one end of a hose or other conductor 83, the other end of which is attached to the nipple 57, so that pressure can flow into the valve cylinder or pressure chest from the passage 55 in the main driving gear. Each cylinder or pressure chest 71 has on opposite sides thereof a nipple 84, each nipple receiving an end of a hose or other coupling 85, so as to allow pressure to pass from the receiving cylinder or pressure chest having the nipple 82 into all of the valve cylinders or pressure chests, charging each cylinder or pressure chest with pressure.
Each cylinder 70 has located and operating therein a piston 86 formed of cup leathers 87, retaining disks or plates 88 and locking nuts 89, and attached to a piston rod 90 by the locking nuts. Each piston rod 90 passes up through a hole or bore in the hanger 62, as shown in Figs. 9 and 10, and its upper end is attached by a connecting nut 91 to a stem 92 secured in a boss 93 on the under side of the bottom 94 of a shoe or shelf, which receives supports and carries around a bottle to be filled. The shoe or shelf has on one side of the bottom an upwardly extending flange or wall 95, terminating as a semi-circular wall or flange 96, and a wall or flange 97 of a less length than the wall or flange 95, as clearly shown in Figs. 3 and 15.

The admission of pressure to the lower end of a motor or power cylinder 70 acts against the piston 86, raising the piston and piston rod, and the upward movement of the piston rod carries with it the shoe or shelf attached thereto, raising the bottle on the shoe or shelf into filling position, with its neck end entered into a closure or sealing cap, surrounding the filling tube, and with the filling tube entered into the interior of the bottle. The admission of pressure to the upper end of each motor or power cylinder 70, causes the pressure to act on the piston 86 and forces the piston downward, carrying with it the piston rod, and the descent of the piston rod 90 depresses or lowers the shoe or shelf attached to its upper end, bringing the shoe or shelf into position for removal of the filled bottle. The raising and lowering of the several shoes or shelves occurs in succession as the plate or table 59 is revolved, so that the bottles are successively raised into filling position, filled and removed without interrupting the continued rotation of the revoluble plate or table, thus enabling the filling of the bottles or packages to be proceeded with, without the necessity of stopping and starting the rotation of the plate or table, in placing a bottle into position for filling and withdrawing the bottle when filled.

The shaft or tubular support 34, adjacent to its upper end, has an annular flange or recess 98 through which bolts 99 pass for attaching the hub or center 100 on the bottom of the filling tank fixedly to the upper end of the revoluble shaft or tubular support 34, for the rotation of the shaft or support 34 to revolve the filling tank. The filling tank, in the construction shown, is of a circular shape in cross section and has a bottom wall 101 and a side wall 102, inclosing a chamber 103 for the liquid supplied thereto through the supply tube 36 from a suitable source of supply. The body of the filling tank has mounted thereon a cover 104, having a peripheral rim 105 with ears 106, which ears coact with ears 107 on the peripheral rim 109 of the body of the tank, and the ears 107 each have pivoted between them a swinging bolt 109, carrying a wing nut 110, by means of which bolts and nuts the cover can be securely attached to the body of the tank; and, in order to insure a tight joint between the cover and the body of the tank, a packing 111 is inserted between the peripheral rims of the cover and tank, as shown in Fig. 2.

The bottom 101 of the filling tank has, adjacent to its circumferential edge, a plurality of holes 112, and each hole 112 has entered therethrough a neck or sleeve 113 having a head 114, the shoulder of which abuts against the inner face of the bottom 101 of the tank. The neck or sleeve 113 has an exterior screw thread which receives a ring nut or sleeve 115, which abuts against the under face of the bottom 101 of the tank, and is held in close contact with the under face of the bottom of the tank by a ring nut 116, threaded onto the end of the neck or sleeve, so that the neck or sleeve is firmly held in position on the bottom of the filling tank. The neck or sleeve 113 and the head 114 have a continuous passage or hole 117 which furnishes a chamber, when closed at its upper and lower ends. The upper end of the hole or chamber 117 is closed by a plug 118, having a contacting flange 119 and threaded into the end of the head 114, so as to effect a tight closure for the upper end of the hole or chamber. The lower end of the hole or chamber 117 is closed by a plug or sleeve 120, threaded into the interior of the neck or sleeve 113, so as to effect a closure at the lower end of the chamber or hole 117, when the parts are assembled; and, as shown, the plug or neck 120 has a head 121 with a square portion to receive a wrench, and a rim or flange portion laterally extending beyond the square portion, as shown in Figs. 16, 17 and 18. The hole or chamber 117 has entered thereinto an annular wall or ring 122, between which and the end of the sleeve or neck 120 is a packing 123, and on the upperside of which is a packing 124, forming a seal on each side of the wall or ring 122 against the escape of liquid and pressure.

The under side of the plug 118 has therein a chamber 125 with which communicates a tube 126, the lower end of which is threaded into the plug and the upper end of which extends above the liquid in the filling tank. The upper end of the tube 126 has a chamber 127, with a valve seat at its bottom which coacts with a valve 128 on a rod 129 extending down through the tube 126 and fixedly entered at its lower end into a cap 130, which, in connection with an annular rim or wall 131, constitutes a piston valve operating in the chamber 117 above the packing 125, which valve serves as a cut off for the flow of liquid into the filling tube from the filling tank. A tube 132, at its upper end is entered into the cap or head 130 for communication with the chamber 125, and this tube extends downwardly and its lower end 133 is turned and passes through the tapered end 134 of a slidable tube 135, operating in the plug or neck 120, and the wall or neck 122, which tube 135 forms the upper section of the filling tube.

The upper section of the filling tube, adjacent to its top, has therein an opening or port 136, in communication with the chamber 117, when the piston valve of the filling tube is raised, as shown in Fig. 18. A tube 137 is entered into the head 114, so as to stand at an inclination, and this tube 137, at its outer end, carries a hood 138 downwardly extending. The tube 137 has a passage 139, furnishing communication between the chamber 117 and a passage 140 in the hood, and the hood has a lower chamber 141, between which and the chamber 140 is a valve seat 142, with which coacts a ball valve 143, located and operating in the chamber 141, and held in the chamber by a cross rod 144 or otherwise, so as to leave a free opening at the mouth of the hood for liquid to enter the tube 137, when the ball valve is down, as shown in Fig. 18, and flow into the chamber 117 to pass through the port 136 into the upper section 135 of the filling tube. The descent of the piston valve at the top of the upper section of the filling tube to the position shown in Fig. 17, closes the inflow of liquid through the tube 137 and causes the pressure of the liquid to raise the ball valve 143 into the position shown in Fig. 17, closing the admission or passage of liquid from the filling tank into the filling tube. It will be understood that when the ball valve 143 is dropped, as shown in Fig. 18, the liquid is free to flow from the filling tank into the filling tube, and when the ball valve 143 is raised, as shown in Fig. 17, the admission of liquid to the tube 137 and to the filling tube is effectually closed.

A closing head or cap 145 is threaded onto the lower end of the upper section of the filling tube, and this head or cap has on its upper end a flange 146, between which and the flange of the head 121 a coil spring 147 is located, which spring serves to hold the closing head or cap 145 depressed or in its lowermost position, and with it the upper section 135 of the filling tube and the piston valve on the upper end of said section, closing the admission of liquid into the filling tube, as shown in Fig. 17. The closing head or cap 145 has a chamber 148, into which the lower end of the upper section 135 of the filling tube extends, so as to open the inlet or port 133 of the pressure conducting tube 132 into the chamber. The chamber terminates in a cross wall 149 having a central hole, and the head or cap 145 outwardly flares for its lower portion, so as to have a curved wall 150, with a curved interior into which is entered the sealing cap. The sealing cap, as shown, is made of vulcanized rubber or other suitable material, and consists of a body or outer portion or wall 151 and a tapered plug 152, with a channel 153 between the outer wall and the central plug, into which channel is entered the upper end of the bottle, so that the central plug and the outer wall will effectually seal the bottle against the escape of pressure and liquid. The lower section 154 of the filling tube is threaded into the lower end of the upper section 135 of such tube, and the lower section has a vent tube 155 with a port or mouth 156 at its upper end opening into the chamber 149, and with a port or mouth 157 at its lower end opening through the wall of the lower section 154 of the filling tube, as shown in Figs. 17 and 18. The pressure can flow into the bottle through the tube 126, tube 132, and tube 155, and can escape or vent from the bottle through these same tubes. The admission of pressure into the bottle, through the tubes 126, 132 and 155, takes place with the upward movement of the piston valve on the upper end of the section 135 of the filling tube, when such upward movement has reached the point to release the valve 128 from its seat, and the pressure can escape or vent from the bottle, so long as the bottle is in position and the piston valve is in its raised position opening the valve 128, as shown in Fig. 18. The removal of the bottle from the closing cap or head, allows the spring 147 to act and force down the closing cap or head, and with it the two sections of the filling tube, drawing down the piston valve at the top of the section 135 of the filling tube, closing the liquid passage 139 and also seating the valve 128, thus shutting off the flow of liquid and the admission of pressure through the filling tube, as long as the parts remain in the position shown in Fig. 17.

The flaring or outwardly curved lower wall 150 of the closing cap or head has, on each side, ears 158 into each of which is entered the upper end of a rod 159; and the lower end of each rod 159 is entered into an ear 160 on opposite sides of a funnel shaped or flaring guide 161, and when in place the rods 159 are securely held in position by nuts 162 on the upper and lower ends of each rod. The guide or centering cap 161 has a cross diameter sufficient to allow of the passage of the necks of bottles of varying sizes and guide and direct the necks so that the mouth or upper end of each bottle will be entered into the sealing or closing cap, as shown by the dotted lines in Fig. 18, thus insuring the proper and perfect entrance of the upper end or mouth of the bottle into the sealing cap for bottles of different sizes, and so that the closing cap will have the plug 152 entered into the mouth of the bottle and the wall 151, closely impinging against the outer surface of the end of the bottle, sealing the bottle against the escape of pressure and liquid.

A float 163 is located and operates in the chamber 103 of the filling tank, and is raised and lowered by the rise and fall of the liquid in the filling tank. This float is attached to the outer or free end of a rod or arm 164, attached by a suitable pin or pivot 165 to the end of a bracket arm or ear 166, formed with or attached to a neck or plug 167 screw threaded into a head or plug 168, having a neck 169 which extends through the wall 102 of the filling tank. The head or plug 168 is held in place by a lock nut 170 threaded onto the exterior of the neck 169 and a shoulder 171 on the head or plug so as to have a fixed relation. The neck 161 extends beyond the outer face of the wall 102 of the filling tank and has therethrough a longitudinal passage 172, into which is threaded a tube 173 of a valve 174, the casing of which has a nipple 175 with a vent passage, which is controlled by the plug of the valve operated from a handle 176 or otherwise. The passage 172 opens into a chamber 177 in the head or plug 168, from which chamber a port or passage 178 opens into the interior of the filling tank, through the wall of the head or plug, as shown in Figs. 21 and 22. The passage 172 is controlled by a valve plug or head 179 on the inner end of a stem 180, which stem is attached by a pin or pivot 181 to the bent end 182 of the rod or bar 164, so that as the float 163 rises with the rise of the liquid in the filling tank the valve plug or head 179 will close the passage 172 and prevent venting of the pressure from the interior of the filling tank, and as the float falls, with the fall of the liquid in the filling tank, the valve plug or head 179 will be withdrawn, opening the passage 172 for the pressure to vent or escape from the interior of the filling tank. It will thus be seen that, by means of the float and the controlling valve actuated therefrom, the maintaining of the pressure in the filling tank and the venting of the pressure from the filling tank, is automatically controlled by the rise and fall of the liquid in the filling tank.

A pipe 183, having a controlling valve 184, leads from a suitable source of pressure supply into a pressure regulator 185, in communication with the chamber 103 of the filling tank above the liquid in such tank for supplying a predetermined pressure to the tank, and a pressure gage 186 is provided for indicating the pressure. A sight opening 187, covered by glass or other transparent material, is provided for inspecting the interior of the tank, and the cover 104, has grab handles 188 for removing and replacing the cover.

The base 1 has a lateral extension 189, through which bolts 190 pass; and to the base, in line with the extension 189, is secured a post or upright 191, having at its bottom a flange 192, through which bolts 193 pass and enter the base, fixedly securing the post or upright 191 in place. A horizontal or lateral bar 194 is attached at one end, by a flange 195 and bolts 196, to the post or upright 191, and at the other end is attached, by a flange 197 and bolts 198, to the yoke or arms 7, so that the cross plate or bar 194 has a fixed relation. A plate 199 is attached to the upper side of the plate or cross bar 194, and this plate 199, at one end has an incline 200 and at the opposite end an incline 201, the incline 200 being of a less length than the incline 201 in the arrangement shown. The stem 77 extends through the bottom plate 67, as shown in Figs. 9 and 10, and this projected end 202 engages the plate or cam 199, as the supporting table 59 rotates, for the contact of the stem 202, as it rides up on the incline 200, to raise the valves 74 and 75 into the position shown in Fig. 9, admitting pressure to the upper end of the motor cylinder 70 and exhaust pressure from the lower end of said cylinder, and the induction and eduction of pressure continues while the stem 202 rides over the flat face of the plate or cam 199, and with the passage of the stem 202 from the plate or cam 199 at the inclined end 201, the valves 74 and 75 are shifted so as to open the port 80 for the admission of pressure to the lower end of the power cylinder 70 and to exhaust pressure through the port 79 from the upper end of such cylinder. The upper end of the valve stem 77 extends through the top wall of the socket 66, and this extended end 203 of the stem is encircled by a spring 204 located between a collar or flange 205 on the end 203 of the stem and the under face of the rotatable table 59, which spring 204 serves to force down the valves 74 and 75 as the end 202 of the piston stem passes down the incline 201 on the cam or plate 199 with the rotation of the table. It will thus be seen that the piston valves 74 and 75 are automatically actuated from the rotation of the table 59, so as to automatically open the ports 79 and 80 to induct and educt pressure from opposite ends of the power cylinder and reciprocate the piston in the power cylinder to positively raise and lower the bottle shelf or support by the action of the admitted pressure. Each bottle shelf or support is successively raised and successively lowered, and each shelf or support is maintained in an elevated position so long as the pressure is maintained on the under side of the piston in its power cylinder, and is allowed to descend for removing the bottle with the eduction of the pressure from the under side of the piston in the power cylinder and the induction of pressure to the upper side of such piston. The elevation of the bottle causes the neck end of the bottle to engage the sealing cap and elevate such cap, and with it the filling tube, permitting liquid to flow into the bottle, and the liquid will continue to flow into the bottle, forcing the pressure therefrom back into the tank, until the pressure in the bottle equals the pressure of the liquid, when the ball valve in the cut-off will be raised by the pressure of the liquid thereon, shutting off the flow of liquid from the filling tank into the bottle. This cut-off valve 143 automatically operates through the pressure, and remains open, so long as the pressure on the liquid and the pressure in the bottle are the same, but when the pressure in the bottle is lower than the pressure on the liquid the cut-off valve rises and shuts off the liquid, thus enabling a defective bottle to be placed in position and be non-filled, as, until the pressure is equalized, the ball valve 143 remains in its elevated position, as shown in Fig. 17, preventing the flow of liquid into the bottle.

The upper end of the post 171 has a support 206 to which is secured, by bolts 207, a platform 208, as shown in Figs. 1 and 2. The platform 208 has mounted on its upper face a guideway 209 for removing the bottles. This guideway 209 is formed of a bottom plate 210 and side walls 211, and is attached to the platform 208 by ears 212, each having a slot 213 for the passage of a bolt 214, the stem of which enters the platform, and at the upper inner corner of the trackway 209, is an ear 215 through which a bolt 216 passes, with the stem of the bolt entering the platform. This arrangement enables the inner end of the trackway to be adjusted in proper alinement with the bottle supports or shelves, so a bottle can enter the trackway between the walls 211, and have each successive bottle, as it enters the trackway, force forward the advance bottles to the point of discharge at the outer end of the platform. This arrangement furnishes an automatic discharge for the bottles, as the table carrying the supports or shelves is rotated. The bottles are automatically removed by pressing against a cross bar 217, having a leg 218 with a flange 219, through which a bolt 220 passes, attaching the cross bar to the platform 208, and the inner end of the bar 217 has a ring 221 encircling the tubular shaft 34 and supported by a ring 222 attached by bolts 223 to the tubular shaft, so that the shaft is free to revolve without affecting the position of the cross bar.

Each bottle, as it is carried around on its raised shelf or support, is filled, and when filled to the full limit the ball valve 143 seats against the seat 142, shutting off the flow of liquid into the bottle, and each bottle, after being filled, as it is carried around, engages the side of the cross bar 217, and by the inclination of the wall 95 of its shelf or support is forced outwardly into the inner end or mouth of the trackway 209, and as each bottle successively enters the trackway the advance bottles are pushed forward to the discharge end of the trackway. It will thus be seen that the entire operation of filling and discharging the bottles is automatically performed, during the rotation of the table and the filling tank, and that each bottle, after it is filled, is positively cut off from receiving a further supply of liquid by the action of the ball or cut off valve 143, thus insuring an accurate filling of each bottle.

The pressure from a suitable source of supply flows through the passage 53 into the passage 33, and out through the passage 56 into the hose or conductor 85, charging all of the valve cylinders of the motor cylinders with pressure, so that, as the table 59 revolves, the several valve cylinders will be under a continuous pressure, and by means of the cam or plate 199, the piston valves in each valve cylinder or chest will be shifted as required to induct and educt pressure automatically from opposite ends of each power cylinder, for the pressure to act and positively raise and lower the supports or shelves for the bottles.

The closing cap is raised by the elevation of the bottle, opening the pressure passage and the liquid supply passage, for equalizing the pressure and allowing liquid to flow from the filling tank into the bottle; and with the discharge of each bottle from its shelf or support, the spring 147 acts and returns the sealing cap and the filling tube to position for closing the pressure passage and the liquid passage, which remain closed until the next bottle is placed on the support or shelf and elevated by the power cylinder. It will thus be seen that the operation of the power cylinders is automatic and likewise the operation of the filling tube is automatic, and that in both instances the operation will take place as the table carrying the power cylinders and the filling tank carrying the filling tube are rotated.

What I claim as new and desire to secure by Letters Patent is:

1. In a machine for bottling liquids, the combination of a tubular main standard, a rotatable gear mounted and rotatable on the upper end of the standard, a rotatable table connected with and carried by the gear, a plurality of bottle supports carried by the rotatable table each support consisting of a power cylinder suspended from the rotatable table, a valve cylinder supported by and in communication with the power cylinder at each end thereof, a reciprocating valve stem operative in the valve cylinder, a valve on the valve stem at each end of and in the valve cylinder, each valve controlling communication between the valve and power cylinders at each end of the cylinders for the induction and eduction of pressure into and from the ends of the power cylinder, means for supplying pressure to the valve cylinder between the valves, a piston in the power cylinder actuated in both directions by pressure admitted to the opposite sides of the piston in the power cylinder, a reciprocating piston stem for the piston, and a shelf supporting a bottle and connected with the piston stem for both raising the bottle into a filling position and lowering the bottle after filling, substantially as described.

2. In a machine for filling bottles with liquid, the combination of a rotatable gear, a tubular shaft downwardly extending from the gear, a pressure supply passage in the tubular shaft, a pressure eduction passage in the gear, a pressure induction passage supplying pressure to the passage of the tubular shaft, a plurality of bottle supports carried by the rotatable gear, each support consisting of a valve cylinder, a motor cylinder in communication at both ends with the valve cylinder, a connection between one valve cylinder and the pressure eduction passage in the gear, a connection between the one valve cylinder and the companion valve cylinders, a valve stem operative in the valve cylinder, a valve on the valve stem at each end of and in the valve cylinder, a piston in the motor cylinder actuated in both directions by pressure admitted to the opposite sides of the piston in the power cylinder, a reciprocating piston stem for the piston and a bottle support on the piston stem for both raising and lowering the bottle support by pressure admitted to the power cylinder at each end thereof, substantially as described.

3. In a machine for bottling liquid, the combination of a tubular main standard, a tubular shaft extending upwardly within and carried by the tubular main standard, a pressure supply passage in the tubular shaft, an induction port for pressure at the lower end of the tubular shaft in communication with the pressure supply passage of the tubular shaft, a ring having an exterior and an interior circumferential passage with ports connecting the two passages and located around the lower end of the tubular shaft within the main standard, and a passage in the main standard for supplying pressure through the passages and ports of the ring to the passage of the tubular shaft, substantially as described.

4. In a machine for bottling liquid, the combination of a tubular main standard, a tubular shaft extending upwardly within carried by the main standard, a pressure supply passage in the tubular shaft, a port at the lower end of the tubular shaft in communication with the pressure supply passage of the tubular shaft, a ring having an exterior and an interior circumferential passage with ports connecting the two passages and located around the lower end of the tubular shaft within the main standard, a lateral passage in the main standard for supplying pressure to the exterior circumferential passage of the ring, a rotatable gear on the upper end of the tubular shaft and having a pressure discharge passage in communication with the pressure supply passage of the shaft, a valve cylinder rotatable with the gear, a connection between the valve cylinder and the pressure passage of the rotatable gear for supplying pressure to the valve cylinder, a power cylinder supported from and rotatable with the gear and carrying and in communication at each end with the valve cylinder, a valve stem operative within the valve cylinder, a valve on the valve stem at each end of and in the valve cylinder, a piston in the power cylinder actuated in both directions by pressure admitted to opposite sides of the piston from the ends of the valve cylinder, a reciprocating piston stem for the piston of the power cylinder and a support for a bottle carried by the piston stem and both raised and lowered by pressure on the piston of the power cylinder, substantially as described.

5. In a machine for bottling liquid, the combination of a main tubular standard, a tubular shaft extending upwardly within and carried by the main standard, a chamber in the main standard surrounding the lower end of the tubular shaft, a supporting plate entered into the chamber below the end of the tubular shaft, a packing within the chamber, a ring between the packing, and having an exterior circumferential channel, an interior circumferential channel, and ports connecting the two channels, a longitudinal pressure passage in the tubular shaft, a port furnishing communication between the inner channel of the ring and the longitudinal pressure passage in the tubular shaft, and a lateral passage in the main standard for supplying pressure to passages and ports of the ring and to the longitudinal passage of the tubular shaft, substantially as described.

6. In a machine for bottling liquid, the combination of a tubular main standard, a tubular shaft extending upwardly within and carried by the main standard, a chamber in the main standard surrounding the lower end of the tubular shaft, a supporting plate entered into the chamber below the end of the tubular shaft, a packing within the chamber, a ring between the packing, and having an exterior circumferential channel, an interior circumferential channel, and ports connecting the two channels, a longitudinal pressure passage in the tubular shaft, a port furnishing communication between the inner channel of the ring and the longitudinal pressure passage in the tubular shaft, a lateral passage in the main standard for supplying pressure to the passages and ports of the ring and to the longitudinal passage of the tubular shaft, a rotatable gear on the upper end of and carrying the tubular shaft, a pressure discharge passage in the rotatable gear leading from the longitudinal pressure passage in the tubular shaft, a valve cylinder rotatable with the gear, a connection between the valve cylinder and the pressure discharge passage in the rotatable gear, a power cylinder suspended from and rotatable with the gear and supporting and carrying and in communication with the valve cylinder at both ends thereof, a valve stem operative in the valve cylinder, a valve on the valve stem at each end of and in the valve cylinder, a piston in each power cylinder, each piston actuated in both directions by pressure admitted to opposite sides of the piston from the ends of the valve cylinder, a reciprocating piston stem for the piston of the power cylinder, and a support for a bottle carried by the piston stem for both raising and lowering the bottle by pressure admitted to each end of the power cylinder, substantially as described.

7. In a machine for bottling liquid, the combination of a horizontal rotatable table, a plurality of power cylinders suspended from and carried by the rotatable table, a valve cylinder for each power cylinder supported by and in communication at each end with its power cylinder, a valve stem for each valve cylinder operative in its cylinder, a valve on each valve stem at each end of and in the valve cylinder, a piston in each power cylinder, each piston actuated in both directions by pressure admitted to opposite sides of the piston from the ends of the valve cylinder, a reciprocating piston stem for the piston of each power cylinder, and a support for the bottle carried by each piston stem, substantially as described.

8. In a machine for bottling liquid, the combination of a rotatable table, a plurality of power cylinders each suspended from and carried by the rotatable table, a valve cylinder for each power cylinder, each valve cylinder supported by its power cylinder and having a port in communication at each end with its power cylinder, a valve stem for each valve cylinder and operative in its cylinder, a valve on each valve stem at each end of and in each valve cylinder and controlling the ports of the power cylinder, a piston in each power cylinder, each piston actuated in both directions by pressure admitted to opposite sides of the piston from the ends of the valve cylinder, a reciprocating piston stem for each piston, and a support for a bottle carried by each piston stem, substantially as described.

9. In a machine for bottling liquid, the combination of a rotatable table, a plurality of power cylinders each power cylinder suspended from and carried by the rotatable table, a valve cylinder for each power cylinder, each valve cylinder supported by and in communication at each end with its power cylinder, a valve stem for each valve cylinder and operative in its cylinder, a valve on each valve stem at each end of and in each valve cylinder, a piston in each power cylinder, each piston actuated in both directions by pressure admitted to opposite sides of the piston from the ends of the valve cylinder, a reciprocating piston stem for each piston, a support for a bottle carried by each piston stem, and means for automatically shifting the position of the valves in each valve cylinder successively as the table revolves, for admitting pressure alternately to opposite ends of each power cylinder, substantially as described.

10. In a machine for bottling liquid, the combination of a rotatable table, a plurality of power cylinders each suspended from and carried by the rotatable table, a valve cylinder for each power cylinder, each valve cylinder supported by and in communication at each end with its power cylinder, a valve stem for each valve cylinder operative in its cylinder, a valve on each valve stem at each end of and in each valve cylinder, a piston in each power cylinder, each piston actuated in both directions by pressure admitted to opposite sides of the piston from the valve cylinder, a reciprocating piston stem for each piston, a support for a bottle carried by each piston stem, a cam engaging successively the stems of the valves in the valve cylinders as the table rotates, for moving the valves on each stem in one direction to admit pressure from the valve cylinder of the moved valve stem to the end of the companion power cylinder, and a spring for returning the valves on each stem and admitting pressure from the valve cylinder of the moved valve stem to the opposite end of the companion power cylinder, substantially as described.

11. In a machine for bottling liquid, the combination of a rotatable table, a plurality of power cylinders each suspended from and carried by the rotatable table, a valve cylinder for each power cylinder, each valve cylinder supported by and in communication at each end with its power cylinder, a valve stem for each valve cylinder operative in its cylinder, a valve on each valve stem at each end and in each valve cylinder, a piston in each power cylinder, each piston actuated in both directions by pressure admitted to opposite sides of the piston from the valve cylinder, a reciprocating piston stem for each piston, a support for a bottle carried by each piston stem, means for automatically and successively shifting the position of each valve as the table rotates for admitting pressure alternately to opposite ends of each power cylinder, and means for admitting pressure to each valve cylinder between the two valves, substantially as described.

12. In a machine for bottling liquids, the combination of a rotatable suspended power cylinder, a valve cylinder adjacent to the power cylinder and supported by and in communication therewith at each end, a valve stem operative in the valve cylinder, a valve on the stem at each end of and in the valve cylinder, a piston in the power cylinder actuated in both directions by pressure admitted to opposite sides of the piston from the ends of the valve cylinder, a reciprocating piston stem for the piston, a support for a bottle carried by the piston stem, and means for admitting pressure to the valve cylinder, substantially as described.

13. In a machine for bottling liquids, the combination of a rotatable power cylinder, a valve cylinder adjacent to the power cylinder and supported by and in communication therewith at each end, a valve stem operative in the valve cylinder, a valve on the valve stem at each end of and in the valve cylinder, a piston in the power cylinder actuated in both directions by pressure admitted to opposite sides of the piston from the ends of the valve cylinder, a reciprocating piston stem for the piston, a support for a bottle carried by the piston stem, means for admitting pressure to the valve cylinder, and means for operating the valve in the valve cylinder to admit pressure alternately to opposite ends of the power cylinder, substantially as described.

14. In a machine for bottling liquids, the combination of a plurality of rotatable power cylinders, a piston in each power cylinder, a reciprocating piston stem for each piston, a bottle support for each piston stem, a valve cylinder for and revoluble with each power cylinder, each valve cylinder supported by and in communication with each end of its power cylinder, a valve stem for each valve cylinder and operative in its cylinder, a valve for each valve stem at each end of and in the valve cylinder, means for endwise moving the valve in each valve cylinder, and means for admitting pressure to each valve cylinder, substantially as described.

15. In a machine for bottling liquids, the combination of a plurality of rotatable power cylinders, a piston in each power cylinder, a reciprocating piston stem for each piston, a bottle support for each piston stem, a valve cylinder for and revoluble with each power cylinder, each valve cylinder supported by and in communication with each end of the power cylinder, a valve stem for each valve cylinder and operative in its cylinder, a valve for each valve stem at each end of and in the valve cylinder, a cam common to the stems of all the valves and operating to successively move the valves in one direction, a spring for each valve stem operating to move the valve stem in the opposite direction, and means for admitting pressure to each valve cylinder, substantially as described.

16. In a machine for bottling liquid, the combination of a rotatable table, a plurality of hangers carried by the rotatable table, a plurality of suspended power and valve cylinders arranged in pairs carried by the hangers, a closing plate for the lower end of each pair of power and valve cylinders, a valve stem in each valve cylinder and operative in its cylinder, a valve for each valve stem at each end of and in the valve cylinder, means for operating the valve stem and valves in each valve cylinder, a piston for each power cylinder, a reciprocating piston stem for each piston, each stem extending through the hanger and the rotatable table, and a support for a bottle on the end of each stem above the table, substantially as described.

17. In a machine for bottling liquid, the combination of a rotatable table, a plurality of hangers carried by the rotatable table, a plurality of suspended power and valve cylinders arranged in pairs carried by the hangers, a closing plate for the lower end of each pair of power and valve cylinders, a valve stem in each valve cylinder and operative in its cylinder, a valve for each valve stem at each end of and in the valve cylinder, means for operating the valve stem and valves in each valve cylinder, a piston for each power cylinder, a reciprocating piston stem for each piston, each stem extending through the hanger and the rotatable table, a support for a bottle on the end of the stem above the table, and means for automatically removing a bottle from its support as the table revolves, substantially as described.

18. In a machine for bottling liquid, the combination of a rotatable table, a plurality of hangers carried by the rotatable table, a plurality of suspended power and valve cylinders arranged in pairs and carried by the hangers, a closing plate for the lower end of each pair of power and valve cylinders, a valve stem in each valve cylinder and operative in its cylinder, a valve for each valve stem at each end of and in the valve cylinder, means for operating the valve stem and valves in each valve cylinder, a piston for each power cylinder, a reciprocating piston stem for each piston, each stem extending through the hanger and the revoluble table, a support for a bottle on the end of the stem above the table, a cross bar successively engaging the filled bottle as the table revolves and operating to automatically remove the engaged bottle, and a guideway receiving the removed bottles, substantially as described.

19. In a machine for bottling liquids, the combination of a plurality of rotatable power cylinders, means for admitting pressure alternately to opposite ends of each power cylinder, a piston in each power cylinder, each piston actuated in both directions by pressure admitted to opposite sides of the piston from the ends of the valve cylinder; a reciprocating piston stem for each piston, and a bottle support for each piston stem and both raised and lowered by the reciprocating travel of the piston from admitted pressure in the power cylinder, substantially as described.

20. In a machine for bottling liquids, the combination of a plurality of rotatable power cylinders, means for admitting pressure alternately to opposite ends of each power cylinder, a piston in each power cylinder, each piston actuated in both directions by pressure admitted to opposite sides of the piston from the ends of the valve cylinder; a reciprocating piston stem for each piston, a bottle support for each piston stem and both raised and lowered by the reciprocating travel of the piston from admitted pressure in the power cylinder, and means for automatically removing a filled bottle from its support as the power cylinders rotate, substantially as described.

21. In a machine for bottling liquids, the combination of a plurality of rotatable power and valve cylinders, a valve stem operative in each valve cylinder, a valve for each valve stem at each end of and in the valve cylinder, means for shifting the valves and admitting pressure alternately to opposite ends of each power cylinder, a piston in each power cylinder, each piston actuated in both directions by pressure admitted to opposite sides of the piston from the ends of the valve cylinder; a reciprocating piston stem for each piston, a bottle support for each piston stem and both raised and lowered by the reciprocating travel of the piston from admitted pressure in the power cylinder, and means for automatically removing a filled bottle from its support as the power cylinders rotate, substantially as described.

22. In a machine for bottling liquids, the combination of a plurality of power and valve cylinders, a valve in each valve cylinder, means for shifting the valve and admitting pressure alternately to opposite ends of each power cylinder, a piston in each power cylinder, a piston stem for each piston, a bottle support for each piston stem raised and lowered by the travel of the piston in the power cylinder, a cam arranged to be engaged successively by the stems of the valves, a spring for returning the valves for admitting pressure alternately to opposite ends of the power cylinder, and means for automatically moving a filled bottle from its support as the power cylinders revolve, substantially as described.

23. In a machine for bottling liquid, the combination of a rotatable table, a power cylinder rotatable with and carried by the table, a piston in the power cylinder and actuated in both directions by pressure admitted to opposite sides of the piston from the ends of the valve cylinder, a reciprocating piston stem for the piston, a bottle support carried by the piston stem, a filling tank rotatable with the table, and a slidable filling tube rotatable with and carried by the filling tank and adapted to enter the bottle with the raising of the bottle by its support, substantially as described.

24. In a machine for bottling liquid, the combination of a rotatable table, a power cylinder rotatable with and carried by the table, a piston in the power cylinder actuated in both directions by pressure admitted to opposite sides of the piston from the ends of the valve cylinder, a reciprocating piston stem for the piston, a bottle support carried by the piston stem, a filling tank rotatable with the table, a slidable filling tube rotatable with and carried by the filling tank and adapted to enter the bottle with the raising of the bottle by its support, and valves operative from the slidable filling tube and controlling the flow of pressure and liquid through the filling tube and actuated by the upward movement of the bottle, substantially as described.

25. In a machine for bottling liquid, the combination of a rotatable table, a power cylinder rotatable with and carried by the table, a piston in the power cylinder actuated in both directions by pressure admitted to opposite sides of the piston from the ends of the valve cylinder, a reciprocating piston stem for the piston, a bottle support carried by the piston stem, a filling tank rotatable with the table, a slidable filling tube rotatable with and carried by the filling tank and adapted to enter the bottle with the raising of the bottle by its support, valves operative from the sliding filling tube and controlling the flow of pressure and liquid through the filling tube, and actuated by the upward movement of the bottle, and a valve within the filling tank automatically controlling the flow of liquid from the filling tank into the filling tube, substantially as described.

26. In a machine for bottling liquid, the combination of a rotatable table, a power cylinder rotatable with and carried by the table, a piston in the power cylinder actuated in both directions by pressure admitted to opposite sides of the piston from the ends of the valve cylinder, a reciprocating piston stem for the piston, a bottle support carried by the piston stem, a filling tank rotatable with the table, a slidable filling tube rotatable with and carried by the filling tank and adapted to enter the bottle with the raising of the bottle by its support, valves operative from the sliding filling tube and controlling the flow of pressure and liquid through the filling tube and actuated by the upward movement of the bottle, a valve within the filling tank automatically controlling the flow of liquid from the filling tank into the filling tube, and means for admitting pressure to and venting pressure from the filling tank, substantially as described.

27. In a machine for filling bottles, the combination of a rotatable table, a plurality of power cylinders rotatable with and carried by the rotatable table, a valve cylinder for each power cylinder, each valve cylinder supported by and in communication at each end with its power cylinder, a valve stem for each valve cylinder and operative in its cylinder, a valve for each valve stem at and in each valve cylinder actuated in both directions by pressure admitted to opposite sides of the piston from the ends of the valve cylinder, a piston in each power cylinder, a reciprocating piston stem for each piston, a bottle support carried by each piston stem, a filling tank rotatable with the table, a plurality of reciprocating filling tubes rotatable with and carried by the filling tank, a closing cap for each filling tube engaged by the neck end of a raised bottle, a valve on each reciprocating filling tube opening communication between the filling tank and the filling tube as the filling tube is raised, and an automatic valve for each filling tube controlling the flow of liquid from the filling tank into the filling tube, substantially as described.

28. In a machine for filling bottles, the combination of a rotatable table, a plurality of power cylinders rotatable with and carried by the rotatable table, a valve cylinder for each power cylinder, each valve cylinder supported by and in communication at each end with its power cylinder, a valve stem for each valve cylinder and operative in its cylinder, a valve for each valve stem at each end and in each valve cylinder, a piston in each power cylinder actuated in both directions by pressure admitted to opposite sides of the piston from the ends of the valve cylinder, a reciprocating piston stem for each piston, a bottle support carried by each piston stem, a filling tank rotatable with the table, a plurality of reciprocating filling tubes rotatable with and carried by the filling tank, a closing cap for each filling tube engaged by the neck end of a raised bottle, a valve on each reciprocating filling tube opening communication between the filling tank and the filling tube as the filling tube is raised, an automatic valve for each filling tube controlling the flow of liquid from the filling tank into the filling tube, and means for admitting pressure into and venting pressure from the filling tank, substantially as described.

29. In a machine for filling bottles, the combination of a rotatable table, a plurality of power cylinders rotatable with and carried by the rotatable table, a valve cylinder for each power cylinder, each valve cylinder supported by and in communication at each end with its power cylinder, a valve stem for each valve cylinder and operative in its cylinder, a valve for each valve stem at each end of and in each valve cylinder, a piston in each power cylinder actuated in both directions by pressure admitted to opposite sides of the piston from the ends of the valve cylinder, a reciprocating piston stem for each piston, a bottle support carried by each piston stem, a filling tank rotatable with the table, a plurality of reciprocating filling tubes rotatable with and carried by the filling tank, a closing cap for each filling tube engaged by the neck end of a raised bottle, a valve on each reciprocating filling tube opening communication between the filling tank and the filling tube as the filling tube is raised, an automatic valve for each filling tube controlling the flow of liquid from the filling tank into the filling tube, means for admitting pressure into and venting pressure from the filling tank, and means connected with the filling tube for equalizing the pressure between the filling tank and the to-be filled bottle, substantially as described.

30. In a machine for bottling liquid, the combination of a rotatable shaft, a horizontal table carried by the shaft, a plurality of power cylinders suspended from the table, a plurality of valve cylinders, one for each power cylinder, and having communication at each end with its power cylinder, a valve for each end of each power cylinder and controlling communication at each end of the valve cylinder with the power cylinder, a piston for each power cylinder actuated in both directions by pressure admitted to the ends of the cylinder from the valve cylinder, a vertically movable bottle support for each piston and carried by and operated from the piston, a filling tank carried by the rotatable shaft, and a plurality of filling tubes mounted on the rotatable filling tank, one filling tube for each bottle support, substantially as described.

31. In a machine for bottling liquid, the combination of a rotatable shaft, a horizontal table carried by the shaft, a plurality of power cylinders suspended from the table, a plurality of valve cylinders, one for each power cylinder, and having communication at each end with its power cylinder, a valve for each end of each power cylinder and controlling communication at each end of the valve cylinder with the power cylinder, a piston for each power cylinder actuated in both directions by pressure admitted to the ends of the cylinder from the valve cylinder, a vertically movable bottle support for each piston and carried by and operated from the piston, a filling tank carried by the rotatable shaft, a plurality of slidable filling tubes mounted on the rotatable filling tank, one filling tube for each bottle support, and valves for and operative from the sliding movement of the filling tube and opened for the flow of pressure and liquid through the filling tube by the upward movement of the bottle and filling tube, substantially as described.

32. In a machine for bottling liquids, the combination of a rotatable shaft, a horizontal table carried by the shaft, a plurality of power cylinders suspended from the table, a plurality of valve cylinders, one for each power cylinder, and having communication at each end with its power cylinder, a valve for each end of each power cylinder and controlling communication at each end of the valve cylinder with the power cylinder, a piston for each power cylinder actuated in both directions by pressure admitted to the ends of the cylinder from the valve cylinder, a vertically movable bottle support for each piston and carried by and operative from the piston, a filling tank carried by the rotatable shaft, a plurality of slidable filling tubes mounted on the rotatable filling tank, one filling tube for each bottle support, valves for and operative from the sliding movement of each filling tube and opened for the flow of pressure and liquid through the filling tube by the upward movement of the bottle and filling tube, and an automatic valve for each filling tube located and operating within the filling tank and controlling the flow of liquid between the tank and the filling tube, substantially as described.

33. In a bottle filling machine, the combination with a filling tank, of a vertical endwise movable filling tube having a port adjacent to its upper end, a closing cap for the upper end of the filling tube, a ring on the upper end of the filling tube constituting, with the cap a piston valve for the filling tube, a casing surrounding the filling tube, and a fixed wall between the casing and filling tube forming a chamber in which the piston valve is movable, the casing having a passage leading into the chamber and controlled by the piston valve for admitting liquid into the chamber to flow through the filling tube, substantially as described.
160

34. In a bottle filling machine, the combination of a filling tank, a vertically endwise movable filling tube carried by the tank, said filling tube composed of an upper section having a port adjacent to its top and a lower section with the lower section entered into the upper section, a piston valve at the top of the upper section of the filling tube, a casing around the upper portion of the upper section of the filling tube, a wall between the casing and the upper section of the filling tube forming a chamber surrounding the piston valve, a sleeve forming a chamber surrounding the juncture of the two sections of the filling tube, a pressure supply tube in communication with the chamber surrounding the valve, a pressure supply tube for the upper section of the filling tube in communication with the chamber for the valve and the junction chamber of the two sections of the filling tube, and a pressure supply tube for the lower section of the filling tube in communication with the junction chamber of the two sections of the filling tube for inducting and educting pressure through the filling tube, substantially as described.

35. In a machine for bottling liquids, the combination of a plurality of rotatable power cylinders, a piston in each power cylinder actuated in both directions by pressure admitted to opposite sides of the piston from the ends of the valve cylinder, a reciprocating piston stem for each piston, a bottle support for each piston stem, a valve cylinder for each power cylinder and rotatable therewith and in communication at each end with the power cylinder, a valve stem for each valve cylinder operative in the cylinder, a valve for each valve stem at each end of and in the valve cylinder, means for moving the valve stem and valves in each valve cylinder, means for admitting pressure to each valve cylinder between the valves, a filling tank rotatable with the power cylinders, and a plurality of vertically slidable filling tubes carried by the filling tank, one filling tube for each bottle support and each filling tube adapted to be opened for the passage of liquid therethrough by the elevation of the bottle and its support, substantially as described.

36. In a machine for bottling liquids, the combination of a plurality of revoluble power cylinders, a piston in each power cylinder, a piston stem for each piston, a bottle support for each piston stem, a valve cylinder for each power cylinder and revoluble therewith and in communication with each end of the power cylinder, a valve in the valve cylinder, a cam common to all of the stems of the valves and operating to move the valves successively in one direction, a spring for each valve stem operating to move the valve stem in the opposite direction, means for admitting pressure to each valve cylinder, a filling tank revoluble with the power cylinders, and a plurality of filling tubes carried by the filling tank, each filling tube adapted to be opened for the passage of liquid therethrough by the elevation of the bottle on its support, substantially as described.

37. In a machine for bottling liquids, the combination of a plurality of rotatable power cylinders, a reciprocating piston for each power cylinder actuated in both directions by pressure admitted to opposite sides of the piston from the ends of the valve cylinder, a piston stem for each piston, a bottle support for each piston stem both raised and lowered by the travel of the piston in the power cylinder, a filling tank rotatable with the power cylinders, and a plurality of vertically slidable filling tubes carried by the filling tank, one filling tube for each power cylinder and each filling tube opened for the flow of liquid and pressure therethrough by the engagement of the bottle raised by the bottle support, substantially as described.

38. In a bottle filling machine, the combination of a plurality of vertically movable and rotatable bottle supports, a power cylinder and piston for each support and operating to both raise and lower the supports by pressure, a filling tank rotatable with the supports, a plurality of vertically slidable filling tubes carried by the rotatable tank, one filling tube for each bottle support and adapted to be opened for the passage of liquid and pressure by the engagement therewith of an elevated bottle on its bottle support, substantially as described.

39. In a bottle filling machine, the combination of a plurality of vertically movable and rotatable bottle supports, a power cylinder and piston for each support and operating to both raise and lower the supports by pressure, a filling tank rotatable with the supports, a plurality of vertically slidable filling tubes carried by the rotatable tank, one filling tube for each bottle support and adapted to be opened for the passage of liquid and pressure by the engagement therewith of an elevated bottle on its bottle support, and means for automatically and successively removing the filled bottles, substantially as described.

40. In a bottle filling machine, the combination of a plurality of vertically movable and rotatable bottle supports, a power cylinder and piston for each support and operating to both raise and lower the supports by pressure, a filling tank rotatable with the supports, a plurality of vertically slidable filling tubes carried by the rotatable tank, one filling tube for each bottle support and adapted to be opened for the passage of liquid and pressure by the engagement therewith of an elevated bottle on its bottle support, a cross bar in the path of rotation of the bottle supports and arranged to engage a filled bottle, and a guideway receiving the filled bottle from the support, substantially as described.

ADOLPH SCHNEIDER.

Witnesses:
OSCAR W. BOND,
WALKER BANNING.